United States Patent [19]

Dankworth et al.

[11] 4,171,277

[45] Oct. 16, 1979

[54] GRANULATED COMPOSITION COMPRISING A POLYMER PHOSPHATE AND AN ALKALI METAL ALUMINUM SILICATE, PROCESS OF MAKING AND METHOD OF USING SAME

[75] Inventors: Jüergen Dankworth, Bensheim; Helmut Hartenstein, Ruelzheim; Ludwig Hertling, Biblis, all of Fed. Rep. of Germany

[73] Assignee: Joh. A. Benckiser GmbH, Ludwigshafen am Rhein, Fed. Rep. of Germany

[21] Appl. No.: 892,209

[22] Filed: Mar. 31, 1978

[30] Foreign Application Priority Data

Apr. 1, 1977 [DE] Fed. Rep. of Germany ....... 2714604

[51] Int. Cl.$^2$ .................. C01B 33/28; C02B 1/44; C11D 3/12; C11D 11/00
[52] U.S. Cl. .................. 252/99; 23/313 R; 23/313 AS; 210/38 A; 210/41; 252/135; 252/140; 252/174; 252/179; 252/174.21; 264/117
[58] Field of Search .................. 23/313 R, 313 AS; 252/89 R, 99, 135, 140, 174, 179; 264/117

[56] References Cited

U.S. PATENT DOCUMENTS

| | | | |
|---|---|---|---|
| 2,568,110 | 9/1951 | Beiley | 252/135 |
| 4,096,081 | 6/1978 | Phenicie | 252/89 R |
| 4,113,644 | 9/1978 | Ashcraft | 252/91 |

FOREIGN PATENT DOCUMENTS

| | | | |
|---|---|---|---|
| 857881 | 12/1977 | Belgium | 252/89 |
| 2543976 | 4/1976 | Fed. Rep. of Germany | 252/140 |
| 2736903 | 2/1978 | Fed. Rep. of Germany | 252/89 |

OTHER PUBLICATIONS

Hooker Industrial Chemicals, Data Sheet No. 904, published 1967.
Davidsohn, A., et al: *Synthetic Detergents,* published by Leonard Hill, London 1967, p. 30.

*Primary Examiner*—Dennis L. Albrecht
*Attorney, Agent, or Firm*—Schwartz, Jeffery, Schwaab, Mack, Blumenthal & Koch

[57] ABSTRACT

A non-caking and freely flowing granulated composition of high abrasion resistance, said composition containing a polymer phosphate and an ion exchanging alkali metal aluminum silicate is provided. At least part of the polymer phosphate in said composition is a highly condensed phosphate, preferably of a phosphorus pentoxide content between about 64% and about 69%. Said composition may contain sodium tripolyphosphate in an amount between about 95% and 0% by weight and preferably between 80% and 60% by weight. Such a composition may also contain a water-soluble tenside which is liquid at room temperature. The process of producing such a granulated composition of a highly condensed phosphate and an alkali metal aluminum silicate to which sodium tripolyphosphate and a tenside may be added, comprises granulation of the mixture of polymer phosphate and alkali metal aluminum silicate by spraying water or a tenside solution thereon. Preferred tensides are ethoxylated nonylphenols. Other agents are conventionally added to the resulting compositions. The resulting granulated compositions have proved to be useful as additives to washing, rinsing, and cleaning agents, as water softening agents, as textile washing agents, and the like.

13 Claims, No Drawings

GRANULATED COMPOSITION COMPRISING A POLYMER PHOSPHATE AND AN ALKALI METAL ALUMINUM SILICATE, PROCESS OF MAKING AND METHOD OF USING SAME

BACKGROUND OF THE INVENTION (1) Field of the Invention

The present invention relates to a non-caking, freely flowing, abrasion resistant, granular composition of a polymeric phosphate and an ion exchanging silicate, to a simple and effective process of making same, and to a method of using said composition in washing, rinsing, and cleaning agents, for water softening, and for other purposes.

(2) Description of the Prior Art

The requirements for a highly effective washing, rinsing, and cleaning agent to be used in washing, rinsing, and cleaning apparatus are of a highly complex nature due to the peculiarities of the dosing devices in such appratus, for instance, in dish washing machines. In order to avoid agglomeration, caking, or lump formation of the cleaning composition in the dosing or measuring chamber and to always assure fully satisfactory flushing or rinsing out of the cleaning agent, the latter is usually employed in the form of a granular composition.

The known washing, rinsing, and cleaning agents contain sodium tripolyphosphate as an essential component. For ecological reasons it has been suggested to replace part of said phosphate-containing builder by water-insoluble, ion exchanging silicates and more particularly by alkali metal aluminum silicates. Such agents have been described in German Published Application No. 2,412,837. However, using such compounds has the disadvantage that they remain in an unwetted state in water for a relatively long period of time. As a result thereof their action is considerably delayed. When using automatic washing machines, it has been found that such cleaning compositions are not fully utilized within the available period of time and/or that unsatisfactory washing results are achieved by the delayed setting free of said agent.

Therefore, attempts have been made to improve the wettability of the alkali metal aluminum silicates. A process of producing an ion exchanging alkali metal aluminum silicate with a hydrophilic surface is described in German Published Application No. 25 10 741. According to said process crystalline alkali metal aluminum silicate is intimately mixed with penta-sodium tripolyphosphate, the mixture is dried, and is comminuted.

The resulting hydrophilic powders, however, frequently do not yield satisfactory results when employed in automatic washing and dish rinsing machines. They readily agglomerate in the dosing containers, they cannot by flushed or washed out without leaving a residue, and due thereto considerable trouble is encountered during the rinsing procedure. Granular compositions of sodium tripolyphosphate (designated hereinafter as STPP) and of alkali metal aluminum silicate (designated hereinafter as AAS), although having a well defined granular structure, are of very limited stability and, as a result thereof, tend to form dust on mixing with additional components of the composition or during compounding. In this case the formation of substantial amounts of dust usually is accompanied by the composition being washed out poorly of the dosing chamber.

Thus it is of considerable importance to produce stable, abrasion resistant, non-caking, free flowing, granular compositions based on polymer phosphates and alkali metal aluminum silicates which compositions do not have the above mentioned disadvantages.

It is also known to improve granulation by the addition of special binding agents as disclosed in German Published Application No. 20 20 427. However, experiments with such binding agents, for instance, with carboxy methyl cellulose or gum arabic, were unsuccessful when mixing an alkali metal aluminum silicate with sodium tripolyphosphate.

Furthermore, spraying of a waterglass solution upon a mixture of sodium tripolyphosphate and sodium silicate as suggested in German Published Application No. 2,039,584 for producing stable granular particles, were also unsuccessful. It was not possible to obtain in this manner abrasion resistant, granular compositions.

SUMMARY OF THE INVENTION

It is one object of the present invention to provide a granular composition containing a polymer phosphate and an ion exchanging alkali metal aluminum silicate which composition is free of the disadvantages of heretofore known granular compositions of similar composition.

Another object of the present invention is to provide a simple and effective process of producing such a granular composition containing a polymer phosphate and an ion exchanging alkali metal aluminum silicate.

A further object of the present invention is to provide a method of using such a granular composition composed of a polymer phosphate and an ion exchanging alkali metal aluminum silicate as washing, rinsing, and cleaning agent and as water softening agent.

Other objects of the present invention and advantageous features thereof will become apparent as the description proceeds.

In principle the stable, abrasion resistant, full-grained, free-flowing, non-caking, granular compositions according to the present invention are characterized by the presence of a highly condensed polymer phosphate. Preferably such highly condensed phosphates correspond to the formula $$Me^I{}_{n+2}P_nO_{3n+1}$$

of a medium chain length, i.e. a polyphosphate in which n is one of the numerals 4 to 50.

The granular compositions according to the present invention can contain, in addition to the highly condensed phosphate, also an alkali metal tripolyphosphate of the formula $Me_5 P_3O_{10}$ and preferably sodium tripolyphosphate in the proportion of 5% to 100% by weight and preferably of 20% to 40% by weight of the highly condensed phosphate and of 95% to 0% by weight and preferably of 80% to 60% by weight of the alkali metal tripolyphosphate.

The proportion by weight of total phosphate to the alkali metal aluminum silicate is between about 20:1 to about 1:20 and preferably between about 2:1 to about 1:2.

Especially suitable highly condensed phosphates useful in preparing granular compositions according to the present invention are polyphosphates with a phosphorus pentoxide content between about 64% and about 69%. These polyphosphates are used in the form of their alkali metal or ammonium salts and preferably of their sodium salts.

Suitable ion exchanging silicates are the silicates disclosed in German Published Applications Nos. 2,412,837 and 2,510,741. The preferred alkali metal aluminum silicates are silicates of the formula

in which
Cat is a cation of the valency n, said cation being exchangeable against calcium;
x is a numeral between 0.7 and 1.5;
Me is boron or aluminum;
y is a numeral between 0.8 and 6.0; and
Z is a numeral between 0 and 13.5.

Especially useful have proved the alkali metal aluminum silicates known as Zeolite types A, X, and Y.

The granular compositions are produced in a horizontal type of mixer or plate-shaped granulating disc by spraying water upon a pulverulent mixture of 1 part to 20 parts by weight of an alkali metal aluminum silicate and 20 parts to 1 part by weight of a polymer phosphate composed of 5% to 100% by weight of a highly condensed phosphate and of 95% to 0% by weight of an alkali metal tripolyphosphate. The reaction heat generated thereby can be utilized for subsequent aging of the granular composition by retaining the same for a prolonged period of time in the granulating device. It has been proved of advantage to subsequently dry the resulting pellets at 50° C. for about 30 minutes. It is an essential feature of the process according to the present invention that water is sprayed during granulation upon the pulverulent mixture of alkali metal aluminum silicate and highly condensed phosphate or a mixture of highly condensed phosphate with alkali metal tripolyphosphate. Only when proceeding in this manner, it is possible to produce an abrasion resistant granulated composition. As will be shown hereinafter, no such abrasion resistant composition is obtained when spraying, for instance, a solution of the highly condensed phosphate upon a mixture of an alkali metal aluminum silicate and tripolyphosphate.

It is also possible to admix, depending upon the contemplated use of the composition, other pulverulent components as they are customarily used in washing and cleaning compositions to the pulverulent mixture of an alkali metal aluminum silicate and of a polyphosphate. Such mixtures are also granulated by spraying with water.

For instance, alkali metal metasilicates and/or alkali metal disilicate, sodium carbonates, organic compounds which contain activated chlorine, agents capable of controlling foaming, corrosion inhibitors, and others can be admixed as additional components to the mixtures according to the present invention before granulation. These additives do not adversely affect granulation and the abrasion resistance of the resulting compositions.

The mixed granular compositions according to the present invention are especially suitable for use as washing, cleaning, and dish rinsing agents or as auxiliary washing agents, for instance, as water softening agents. They can be admixed to other components of cleaning compositions.

The compositions of the present invention can be stored in simple packages or wrappings for prolonged periods of time without any decrease in their flowing ability. Aggregation or formation of lumps does not occur in the dosing chambers of washing and dish rinsing machines. Thus they can be flushed out in a satisfactory manner.

In some instances, especially when using the granulated composition in washing agents for textiles, it has proved to be of advantage to add a water-soluble tenside which is liquid at room temperature, to the granulated composition containing the highly condensed phosphate. Without such a tenside addition the granulates form skeletons of silicate which are somewhat larger than the silicate particles added for granulation. Such larger silicate particles can occasionally cause trouble on washing of textiles because the insoluble silicate particles cannot be removed readily by rinsing the textile fabrics. Surprisingly it has been found that this disadvantage is not encountered when adding a small amount of certain tensides to the washing composition. Addition of tensides prevents substantially completely aggregation to larger silicate agglomerates.

Preferred tensides are nonylphenol with 5 moles to 15 moles of ethylene oxide or also types of tensides such as poly-oxypropylene-polyoxyethylene block polymers, for instance, the products sold by the firm Wyandotte under the trademark Pluronic L 64 which is a polyoxypropylene-polyoxyethylene addition product with 40% of poly-oxyethylene of a molecular weight of 1750; or Pluronic L 92 which is a poly-oxypropylene—polyoxyethylene addition product with 20% of poly-oxyethylene of a molecular weight of 2750. The effect of the added tenside is shown in Table II as given hereinafter.

The tenside content is between about 0.5% and about 5% and preferably between about 1% and 2% calculated for the content of alkali metal aluminum silicate and total phosphate.

To produce granulates which contain tensides, preferably the aqueous tenside solution is sprayed upon the pulverulent mixture of the raw materials during granulation. It is, however, possible to add the tenside to the mixture of the raw materials and to spray water subsequently thereon.

Other components as they are usually present in washing and cleaning agents and detergents can also be admixed to the mixture of alkali metal aluminum silicates and polyphosphates before granulating the mixture.

DESCRIPTION OF THE PREFERRED EMBODIMENTS

The present invention is illustrated more in detail by the following examples, without, however, being limited thereto.

Granulation is effected in each case in a granulating plate device of the firm Eirich. The granulating plate has a diameter of 40 cm. and a height of 10 cm. at its edge. The device is inclined horizontally by 55°. Its number of revolution is 40 revolutions per minute.

EXAMPLE 1

125 g. of substantially anhydrous, well flowable, pulverulent sodium tripolyphosphate of a phase I content of 8% and a bulk weight of 1000 g./l. (as it is produced at a relatively high temperature), 320 g. of zeolite type A 40 of an average particle size of about 4μ., a loss of ignition of 22% (determined according to the specifications of DIN 55921 but by heating at 800° C. for 1 hour), and a bulk weight of 380 g./l., and 125 g. of a finely pulverized, highly condensed phosphate of a phosphorus pentoxide content of 64.5% and a bulk weight of 1100 g./l. are mixed in the dry state and introduced into the granulating plate-like device.

130 g. of water are sprayed upon said mixture within 4 minutes. The resulting granulated composition is kept in the granulating plate for 20 more minutes while continuing rotation of the plate. During granulation the temperature of the granulate adjusts itself to a temperature of about 45° C. by its inherent reaction. The resulting 625 g. of the granulated composition have a granular, abrasion resistant structure. The composition does not cake or form lumps thereafter. Its bulk weight is 770 g./l. its water content (determined by heating at 500° C. for 30 minutes) is 20%, its phosphorus pentoxide content is 24.5%, and it silicon dioxide content is 16.8%.

The following mixtures are granulated in the same manner as described in Example 1.

EXAMPLE 2

500 g. of zeolite Type A 40,
15 g. of a highly condensed phosphate ($P_2O_5$-content: 68%),
35 g. of sodium tripolyphosphate, and
170 g. of water.
Bulk weight of the resulting granulate: 580 g./l.;
Water content (on drying at 500° C. for 30 minutes): 27.9%;
$P_2O_5$-content: 5.1%;
$SiO_2$-content: 27.0%.

EXAMPLE 3

50 g. of zeolite Type A 40,
150 g. of a highly condensed phosphate ($P_2O_5$-content: 68%),
380 g. of sodium tripolyphosphate, and
70 g. of water.
Bulk weight of the resulting granulate: 790 g./l.;
water content (on drying at 500° C. for 30 minutes): 7.5%;
$P_2O_5$-content: 53.2%;
$SiO_2$-content: 2.8%.

EXAMPLE 4

320 g. of zeolite Type A 40,
250 g. of highly condensed phosphate ($P_2O_5$-content: 64.5%), and
110 g. of water.
Bulk weight of the resulting granulate: 740 g./l.;
water content (on drying at 500° C. for 30 minutes): 18.9%;
$P_2O_5$-content: 26.1%;
$SiO_2$-content: 17.1%.

EXAMPLE 5

A dish-rinsing composition is obtained by first producing a pulverulent mixture of
250 g. of zeolite Type A 40,
100 g. of a highly condensed phosphate ($P_2O_5$-content: 64.5%),
100 g. of sodium tripolyphosphate,
276 g. of anhydrous pulverulent sodium metasilicate,
95 g. of sodium carbonate, and
15 g. of sodium dichloro isocyanurate.
The resulting pulverulent mixture is granulated as described in Example 1 by spraying thereon 150 cc. of water containing dissolved therein
10 g. of Marlophen 85 (nonyl phenol polyglycol ether with 5 moles of ethylene oxide).
The resulting granulated composition can directly be used as dish rinsing agent in dish washing machines.

EXAMPLE 6

A granulated composition is produced by granulating a mixture of
300 g. of zeolite Type A 40,
45 g. of a highly condensed phosphate ($P_2O_5$-content: 64.5%), and
105 g. of sodium tripolyphosphate
by spraying thereon
120 g. of water and otherwise proceeding as described hereinabove.

EXAMPLE 7

A granulated composition is produced by granulating a mixture of
150 g. of zeolite Type A 40,
90 g. of a highly condensed phosphate ($P_2O_5$-content: 64.5%), and
210 g. of sodium tripolyphosphate
by spraying thereon
90 g. of water
and otherwise proceeding as described hereinabove.

EXAMPLE 8

A granulated composition is produced by granulating a mixture of
25 g. of zeolite Type A 40,
150 g. of a highly condensed phosphate ($P_2O_5$-content: 64.5%), and
350 g. of sodium tripolyphosphate
by spraying thereon
70 g. of water
and otherwise proceeding as described hereinabove.

EXAMPLE 9

A granulated composition is produced by granulating a mixture of
500 g. of zeolite Type A40,
7.5 g. of a highly condensed phosphate ($P_2O_5$-content: 64.5%), and
17.5 g. of sodium tripolyphosphate
by spraying thereon
300 g. of water
and otherwise proceeding as described hereinabove.

EXAMPLE 10

50 g. of zeolite Type A40,
150 g. of a highly condensed sodium phosphate ($P_2O_5$-content: 68%),
350 g. of potassium tripolyphosphate, and
70 g. of water.
The mixture is granulated as described in Example 1. Bulk weight of the granulated composition: 750 g./l.; water content (on drying at 500° C. for 30 minutes): 7.9%; $P_2O_5$-content: 43.2%.

The highly condensed phosphate as used in Examples 1 to 9 is preferably a sodium phosphate.

EXAMPLE 11

50 g. of zeolite Type A40,
150 g. of a highly condensed potassium phosphate (medium chain length n=25; phosphorus pentoxide content: 58.2%), and 350 g. of sodium tripolyphosphate
are granulated by spraying thereon
70 g. of water.
Bulk weight of the granulate: 770 g./l.;
Water content (on drying at 500° C. for 30 minutes): 7.7%;
$P_2O_5$-content: 46.5%.

EXAMPLE 12

A pulverulent mixture composed of
200 g. zeolite Type A40,
50 g. of a highly condensed sodium phosphate ($P_2O_5$-content: 68%),
150 g. of sodium tripolyphosphate,
100 g. of sodium disilicate,
30 g. of soap,
20 g. of carboxy methyl cellulose, and
0.1 g. of a conventional brightening agent are granulated by spraying thereon
200 g. of a granulating liquid composed of
100 g. of water,
70 g. of Marlophen 89, and
30 g. of tallow fatty alcohol ethoxylate with 11 moles of ethylene oxide.
Subsequently there are admixed to the granulate
250 g. of sodium perborate.
The resulting granulated compound is a useful washing agent.

EXAMPLE 13

200 g. of zeolite Type A40,
50 g. of a highly condensed sodium phosphate ($P_2O_5$-content 68%),
150 g. of sodium tripolyphosphate, and
100 g. of water
are granulated as described in Example 1 hereinabove. The resulting granulated composition is then mixed with a mixture composed of
250 g. of sodium perborate,
100 g. of sodium disilicate,
70 g. of LAS (linear alkane sulfonate),
30 g. of soap (sodium palmitate),
30 g. of a tallow fatty alcohol with 11 moles of ethylene oxide,
20 g. of carboxy methyl cellulose, an optical brightener, and perfume.
After drying the resulting mixture
250 g. of sodium perborate
are mixed thereto on the granulating plate.

The following granulated compositions are produced for comparison sake in an analogous manner as described in Example 1. They differ from the compositions of Examples 1 to 13 according to the present invention as stated.

Comparative Example A

Analogous to Example 1, but without the addition of the highly condensed phosphate.
320 g. of zeolite Type A40,
250 g. of sodium tripolyphosphate,
250 g. of water.
Bulk weight: 660 g./l.;
water content: (on drying at 500° C. for 30 minutes): 24.1%;
$P_2O_5$-content: 22.0%;
$SiO_2$-content: 16.0%.

Comparative Example B

Analogous to Example A, but granulated with an aqueous solution of a highly condensed phosphate.
320 g. of zeolite Type A40,
250 g. of sodium tripolyphosphate,
250 g. of water containing dissolved therein
62.5 g. of a highly condensed phosphate ($P_2O_5$-content: 64,5%) corresponding to a 25% aqueous solution.
Bulk weight: 630 g./l.;
water content (on drying at 500° C. for 30 minutes): 20.9%;
$P_2O_5$-content: 26.0%;
$SiO_2$-content: 14.8%.

Comparative Example C

Analogous to Example A, but granulated with an aqueous carboxy methyl cellulose solution.
320 g. of zeolite Type A40,
250 g. of sodium tripolyphosphate,
150 g. of an aqueous 2% carboxy methyl cellulose solution.
Bulk weight: 670 g./l.,
water content (on drying at 500° C. for 30 minutes): 23.1%;
$P_2O_5$-content: 22.3%;
$SiO_2$-content: 16.2%.

Comparative Example D

Analogous to Example A, but granulated with an aqueous gum arabic solution.
320 g. of zeolite Type A40,
250 g. of sodium tripolyphosphate,
250 g. of an aqueous 5% gum arabic solution.
Bulk weight: 700 g./l.;
water content (on drying at 500° C. for 30 minutes): 26.7%;
$P_2O_5$-content: 21.3%,
$SiO_2$-content: 15.4%.

Comparative Example E

Analogous to Example 12, but without the addition of the highly condensed phosphate.
250 g. of zeolite Type A40,
20 g. of sodium tripolyphosphate,
276 g. of anhydrous, pulverulent sodium metasilicate,
95 g. of sodium carbonate,
15 g. of sodium dichloro isocyanurate,
190 g. of water.

The high effectiveness and superior properties of the granulated compositions according to the present invention over the compositions of the comparative examples is demonstrated by the tests described hereinafter. The comparison of said compositions is based on their resistance to abrasion. To carry out said abrasion resistance test the distribution of the particle sizes of the granulated compositions was determined before and after a treatment of the granulates with freely moveable nylon brushes to achieve increased mechanical abrasion during screening. Additionally the flowability and the capability of being flushed out of the samples was determined.

(1) Abrasion resistance

I. Determination of the distribution of the particle sizes of the granulates by screening analysis.

For carrying out the test, 100 g. of the sample to be tested were weighed exactly and were placed upon a screen of the greatest width of mesh, i.e. of 1000μ of a standardized test screening set according to DIN 4188. After screening the sample on a vibration machine with a force-controlled three-dimensional movement of the screen for five minutes, the resulting screened fractions were weighed. The residues of the sample on the various screens were weighed cumulatively, i.e. the residue on each screen was weighed in each instance only after it was combined with the subsequently screened finer residue.

II. Abrasion resistance

After the first screen analysis test had been completed, the entire sample was again subjected to a second screen analysis test whereby freely movable nylon brushes were caused to act on all screens. The abrasion resistance was determined by directly comparing the first analysis test results with those of the second screen analysis test.

The following Table 1 shows the results in percent obtained on a screen analysis according to DIN 4188. The values under I were those obtained by the first screen analysis test without testing for abrasion while the values under II were those obtained by the second screen analysis test with testing for abrasion (by means of the nylon brushes).

lished Application No. 2,606,684. In said application the glassy phosphates are protected against contact with other components by a specific organic film. The granulates obtained according to the examples given hereinabove which are characterized by a content of highly condensed phosphate, do not have the disadvantages pointed out in said application. They can be packed immediately after granulation. They exhibit an excellent flowability even after a storage time of three months when packed and sealed in conventional folding cartons.

(3) Test for its ability of being flushed out

The granulated compositions of the following standard composition are used as dish washing agents in dish washing machines. Such a standard composition contains:
 45% of the granulated composition according to the present invention,
 51% of anhydrous sodium metasilicate Type Simet AN (of the firm Sifrance, Paris),
 2% of the tenside known by the trademark Plurafac RA 40 which is a straight chain hydroxy ethylated alcohol (of the firm Kuhlmann, France), and
 2% of sodium dichloro isocyanurate.

Such compositions were tested for their behavior of being flushed out of the dosing device of an automatic dish washing machine. 40 g. of the rinsing agent were used in said test. In each case it was found that the granulated rinsing agent according to the present invention showed excellent flushing out times, i.e. they are completely flushed out within two to three minutes.

Table I

| | 1000μ | | 500μ | | 125μ | | <125μ | |
|---|---|---|---|---|---|---|---|---|
| Example | I | II | I | II | I | II | I | II |
| 1 | 11.7 | 9.9 | 47.0 | 46.6 | 98.7 | 98.9 | 1.3 | 1.1 |
| 2 | 13.2 | 9.8 | 39.6 | 24.3 | 94.8 | 89.3 | 5.2 | 11.7 |
| 3 | 26.9 | 25.2 | 78.9 | 78.9 | 98.3 | 97.8 | 1.7 | 2.2 |
| 4 | 23.6 | 21.9 | 69.7 | 69.2 | 99.1 | 98.5 | 0.9 | 1.5 |
| 5 | 21.9 | 21.1 | 75.8 | 73.9 | 95.7 | 95.5 | 4.3 | 4.5 |
| 6 | 28.6 | 27.3 | 79.8 | 72.2 | 95.9 | 95.4 | 4.1 | 4.6 |
| 7 | 24.3 | 24.1 | 73.9 | 72.3 | 98.5 | 98.3 | 1.5 | 1.7 |
| 8 | 25.3 | 25.2 | 71.5 | 70.9 | 98.2 | 97.9 | 1.8 | 2.1 |
| 9 | 14.9 | 4.6 | 80.2 | 58.6 | 93.7 | 89.3 | 6.3 | 11.7 |
| 10 | 24.0 | 22.0 | 75.0 | 76.5 | 99.0 | 98.5 | 1.0 | 1.5 |
| 11 | 21.5 | 20.6 | 76.8 | 76.6 | 98.3 | 97.2 | 1.7 | 2.8 |
| Comparative | 1000μ | | 500μ | | 125μ | | <125μ | |
| Examples | I | II | I | II | I | II | I | II |
| A | 35.1 | 0.9 | 72.5 | 57.5 | 97.2 | 93.5 | 2.8 | 6.5 |
| B | 16.0 | 0.5 | 66.0 | 20.5 | 96.8 | 86.0 | 3.2 | 14.0 |
| C | 43.3 | 0.6 | 83.3 | 11.1 | 98.7 | 84.3 | 1.3 | 15.7 |
| D | 8.1 | 0.0 | 60.1 | 2.7 | 95.6 | 78.5 | 4.4 | 21.5 |
| E | 14.7 | 8.2 | 69.9 | 49.1 | 98.3 | 94.3 | 1.7 | 5.7 |

The excellent abrasion resistance of the granulated compositions of Examples 1 to 11 according to the present invention compared with that of the granulated compositions obtained according to the comparative examples A to E is clearly evident from the exceptional preservation of the granular structure in the second screen analysis test.

A second analysis was not carried out with the compositions of Examples 12 and 13 because the structure of the perborate contained therein is of some importance in this case and affects the results.

(2) Flowability

The flowability of granulated compositions containing highly condensed phosphates offers many problems as this is well known. See, for instance, German pub- Examples for various tenside additions In an analogous manner as described in Example 1 there are produced granulated compositions as follows:
 320 g. of zeolite Type A40,
 75 g. of a highly condensed phosphate ($P_2O_5$-content: 64.5%)
 175 g. of sodium tripolyphosphate, and
 150 g. of water to which in each instance 8.5 g. of the respective tenside was added. The tenside amount added corresponds to 1.5%, calculated for the mixture of alkali metal aluminum silicate and total phosphate.

5 g. of each granulate were stirred in 150 cc. of water for 5 minutes. The mixture was allowed to settle for 10 minutes.

Thereafter, the residue was microscopically examined and the structure of the zeolite was compared with the structure of the starting zeolite Type A40. The results are given in Table II as indicated by the following numerals:

1—Grain structure of the zeolite type remained practically unchanged.
2—Slight enlargement of the zeolite particles.
3—Medium enlargement of the zeolite particles.
4—Considerable enlargement of the zeolite particles.

Table II

| No. of Experiment | Tenside | State of Aggregation | Result |
|---|---|---|---|
| 1 | Marlophen 89 | liquid | 1 |
| 2 | Marlophen 85 | liquid | 1 |
| 3 | Pluronic L92 | liquid | 2 |
| 4 | Pluronic L64 | liquid | 2 |
| 5 | Pluronic F68 | solid | 4 |
| 6 | Marlon A350 | solid | 4 |

In these tests the following tensides were used:
Marlophen 89: Nonylphenol polyglycol ether with 9 ethoxy groups.
Marlophen 85: Nonylphenol polyglycol ether with 5 ethoxy groups.
Pluronic L92: Polyoxy propylene-polyoxy ethylene adduct with 20% of polyoxyethylene.
Pluronic L64: Polyoxy propylene-polyoxy ethylene adduct with 40% of polyoxyethylene.
Pluronic F68: Polyoxy propylene-polyoxy ethylene adduct with 80% of polyoxyethylene.
Marlon A35: Sodium salt of dodecyl benzene sulfonic acid 50%.

The results of Table II show that formation of silicate skeletons does not take place on addition of liquid tensides, i.e. only a slight enlargement of the zeolite particles or none at all is observed. Solid tensides are not suitable since they cause considerable enlargement of the zeolite particles.

Although the sodium salts of the highly condensed phosphates are the preferred alkali metal salts of such compounds, the potassium salts, ammonium salts, and other alkali metal salts of said highly condensed phosphates can also be used.

As stated above, the substantially water-insoluble alkali metal aluminum silicates can at least partly be replaced by the alkali metal boron silicates of the formula as given hereinabove. The preparation of such substantially water-insoluble alkali metal boron or aluminum silicates is described in the above-mentioned German Published Applications No. 2,412,837 and No. 2,510,741.

The linear alkane sulfonates used, for instance, in Example 13 are sulfonates of the formula $$R-\underset{SO_3Na}{\underset{|}{CH}}-R'$$

and $$R-SO_3Na$$

which are produced, for instance, by sulfoxidation of n-paraffins. R and R' in said formula indicate preferably alkyl with 12 to 18 carbon atoms. Such linear alkane sulfonates are sold, for instance, by the firm Farbwerke Hoechst AG under the trademark "HOSTAPUR".

The ethoxylated tallow fatty alcohol used in Example 13 is, for instance, an ethoxylated alcohol sold under the trademark "ENAPOL T-110" of Farbwerke hoechst AG. These and other polyglycol ethers of straight chain saturated higher molecular fatty alcohols of the formula $R-CH_2-O-(CH_2CH_2O)_nH$ may contain between 11 and 25 moles of ethylene oxide attached to such a higher molecular fatty alcohol. Of course, other linear alkane sulfonates as well as other ethoxylated fatty alcohols may be added to the claimed compositions according to the present invention.

Of course, many changes and variations in the composition of the granulates according to the present invention, in the process of producing same, in the addition of other conventional additives to such compositions, in their use as washing, rinsing, and cleaning agents, as agents for softening water, as washing agents for textile materials, and the like, may be made by those skilled in this art in accordance with the principles set forth herein and in the annexed hereto.

We claim:
1. An agglomerate composition comprising a highly condensed polymer phosphate of the formula

$$Me^I_{(n+2)}P_nO_{(3n+1)}$$

wherein n represents one of the numerals 4 to 50, and
$Me^I$ represents an alkali metal cation or ammonium, and an ion-exchanging alkali metal aluminum silicate, in a by-weight ratio of highly condensed polymer phosphate to alkali metal aluminum silicate of from about 2:1 to about 1:2.

2. The composition of claim 1, which further comprises such an amount of sodium tripolyphosphate to obtain a mixture of polymer phosphates comprising 5 to 100% by weight of the highly condensed polymer phosphate and 0 to 95% by weight of the sodium tripolyphosphate, and a ratio of polymer phosphates to alkali metal aluminum silicate of from about 2:1 to about 1:2 in the composition.

3. The granulated composition of claim 2, in which the highly condensed phosphate is present in an amount between about 20% and about 40% by weight and the sodium tripolyphosphate in an amount between about 80% and about 60% by weight.

4. The granulated composition of claim 2, in which the proportion of total phosphate to alkali metal aluminum silicate is between about 1:20 and about 20:1.

5. The granulated composition of claim 2, in which the proportion of total phosphate to alkali metal aluminum silicate is between 2:1 and 1:2.

6. The granulated composition of claim 1, in which the highly condensed phosphate is a polyphosphate with a phosphorus pentoxide content between about 64% and about 69%.

7. The composition of claim 11, which additionally comprises a water-soluble surfactant which is liquid at room temperature in an amount of between about 0.5 and about 5% by weight relative to the total phosphate and alkali metal aluminum silicate content in the composition.

8. The granulated composition of claim 7, in which the surfactant is an ethoxylated nonylphenol with 5 moles to 15 moles of ethylene oxide.

9. The granulated composition of claim 7, said composition containing between about 1% and about 2% by weight of the surfactant calculated for the total phosphate and alkali metal aluminum silicate content of the composition.

10. The composition of claim 1, in which the ion exchanging alkali metal aluminum silicate is at least partly replaced by an ion exchanging alkali metal boron silicate.

11. A process for preparing an agglomerated composition as defined in claim 11, which comprises the steps of
(a) preparing a pulverulent mixture comprising a highly condensed polymer phosphate of the formula $$Me^I_{(n+2)}P_nO_{(3n+1)}$$

wherein n represents one of the numerals 4 to 50, and $Me^I$ represents an alkali metal cation or ammonium, and such an amount of an ion-exchanging alkali metal aluminum silicate, that the by weight ratio of the highly condensed polymer phosphate to the alkali metal aluminum silicate is from about 2:1 to about 1:2; and
(b) granulating the pulverulant mixture by spraying it with water in a granulating device.

12. The process of claim 11, wherein step (a) further comprises admixing to the pulverulent mixture an effective amount of at least one of the following additives: alkali metal metasilicates, alkali metal disilicates, sodium carbonates, active chlorine-containing organic compounds, foam-inhibiting agents, corrosion-inhibiting agents, and mixtures thereof.

13. The process of claim 11, which further comprises the step of admixing to the pulverulant mixture a water-soluble surfactant which is liquid at room temperature in an amount of between about 0,5 and about 5% by weight relative to the total phosphate and alkali metal aluminum silicate content in the composition.

* * * * *